United States Patent
Kleyn

(10) Patent No.: US 7,152,901 B2
(45) Date of Patent: Dec. 26, 2006

(54) VEHICLE VISOR CONSTRUCTION AND METHOD

(75) Inventor: Richard A. Kleyn, Hudsonville, MI (US)

(73) Assignee: Innotec Corporation, Zeeland, MI (US)

( * ) Notice: Subject to any disclaimer, the term of this patent is extended or adjusted under 35 U.S.C. 154(b) by 49 days.

(21) Appl. No.: 10/972,142

(22) Filed: Oct. 22, 2004

(65) Prior Publication Data

US 2006/0087147 A1    Apr. 27, 2006

(51) Int. Cl.
*B60J 3/00* (2006.01)
(52) U.S. Cl. .................................. 296/97.1; 296/97.5
(58) Field of Classification Search ................ 296/97.1
See application file for complete search history.

(56) References Cited

U.S. PATENT DOCUMENTS

| | | | |
|---|---|---|---|
| 2,279,648 A | | 4/1942 | Westrope |
| 2,340,015 A | | 1/1944 | Felcher et al. |
| 3,551,963 A | * | 1/1971 | Mosher et al. ............... 24/618 |
| 3,827,748 A | * | 8/1974 | Herr et al. ................. 296/97.1 |
| 4,275,916 A | * | 6/1981 | Skogler ..................... 296/97.5 |
| 4,417,761 A | | 11/1983 | Cziptschirsch et al. |
| 4,458,938 A | | 7/1984 | Viertel et al. |
| 4,469,367 A | | 9/1984 | Kuttler et al. |
| 4,763,946 A | * | 8/1988 | Robbins et al. ............ 296/97.1 |
| 4,810,023 A | | 3/1989 | Kawada |
| 4,867,500 A | | 9/1989 | Oosterbaan et al. |
| 4,890,875 A | | 1/1990 | Takahashi |
| 4,925,233 A | | 5/1990 | Clark |
| 4,988,140 A | | 1/1991 | Van Order |
| 5,004,289 A | | 4/1991 | Lanser et al. |
| 5,007,532 A | * | 4/1991 | Binish ........................ 296/97.1 |
| 5,044,687 A | | 9/1991 | Abu-Shumays et al. |
| 5,056,852 A | * | 10/1991 | Miller ....................... 296/97.1 |
| 5,066,061 A | | 11/1991 | Miller |
| 5,131,711 A | * | 7/1992 | Laferle ..................... 296/97.1 |
| 5,221,120 A | | 6/1993 | Viertel et al. |
| 5,251,949 A | | 10/1993 | Miller et al. |
| 5,308,136 A | * | 5/1994 | Schwarz et al. .......... 296/97.1 |
| 5,308,137 A | * | 5/1994 | Viertel et al. ............. 296/97.1 |
| 5,328,227 A | | 7/1994 | Pax, Jr. et al. |
| 5,338,082 A | * | 8/1994 | Miller ....................... 296/97.1 |
| 5,338,083 A | | 8/1994 | Gute |
| 5,409,285 A | | 4/1995 | Snyder et al. |
| 5,538,310 A | | 7/1996 | Frankhouse et al. |
| 5,653,490 A | | 8/1997 | Fink et al. |
| 5,765,899 A | | 6/1998 | Watjer et al. |
| 5,810,421 A | | 9/1998 | Kalkman et al. |
| 5,860,690 A | | 1/1999 | Dellinger et al. |
| 5,887,933 A | * | 3/1999 | Peterson ................... 296/97.1 |
| 5,967,587 A | | 10/1999 | Collet et al. |

(Continued)

FOREIGN PATENT DOCUMENTS

JP     5286362     11/1993

*Primary Examiner*—Kiran B. Patel
(74) *Attorney, Agent, or Firm*—Price, Heneveld, Cooper, DeWitt & Litton, LLP

(57) ABSTRACT

A visor for vehicles and the like includes a core made of a meltable material. The core includes first and second halves that are interconnected by a connecting arrangement that includes posts that are frictionally received in openings. The posts may form an interference fit with the openings, such that the visor core material melts as the posts are pressed into the openings to thereby weld the core material at the connectors together and interconnect the halves of the visor core.

16 Claims, 5 Drawing Sheets

U.S. PATENT DOCUMENTS

| | | |
|---|---|---|
| 5,967,588 A | 10/1999 | Collet et al. |
| 6,010,174 A | 1/2000 | Murdock et al. |
| H1834 H | 2/2000 | Wilson et al. |
| 6,042,172 A | 3/2000 | Murdock |
| 6,174,019 B1 | 1/2001 | Collet et al. |
| 6,231,105 B1 | 5/2001 | Viertel |
| 6,254,168 B1 | 7/2001 | Crotty, III |
| 6,286,887 B1 | 9/2001 | Hashmi |
| 6,402,221 B1 | 6/2002 | Ogunjobi |
| 6,543,832 B1 * | 4/2003 | Bogdanski et al. ........ 296/97.1 |
| 6,634,696 B1 * | 10/2003 | Tiesler ...................... 296/97.1 |
| 6,669,262 B1 * | 12/2003 | Crotty et al. .............. 296/97.1 |
| 6,692,059 B1 * | 2/2004 | Mills ......................... 296/97.1 |
| 2004/0066056 A1 * | 4/2004 | Mills et al. ................ 296/97.1 |

* cited by examiner

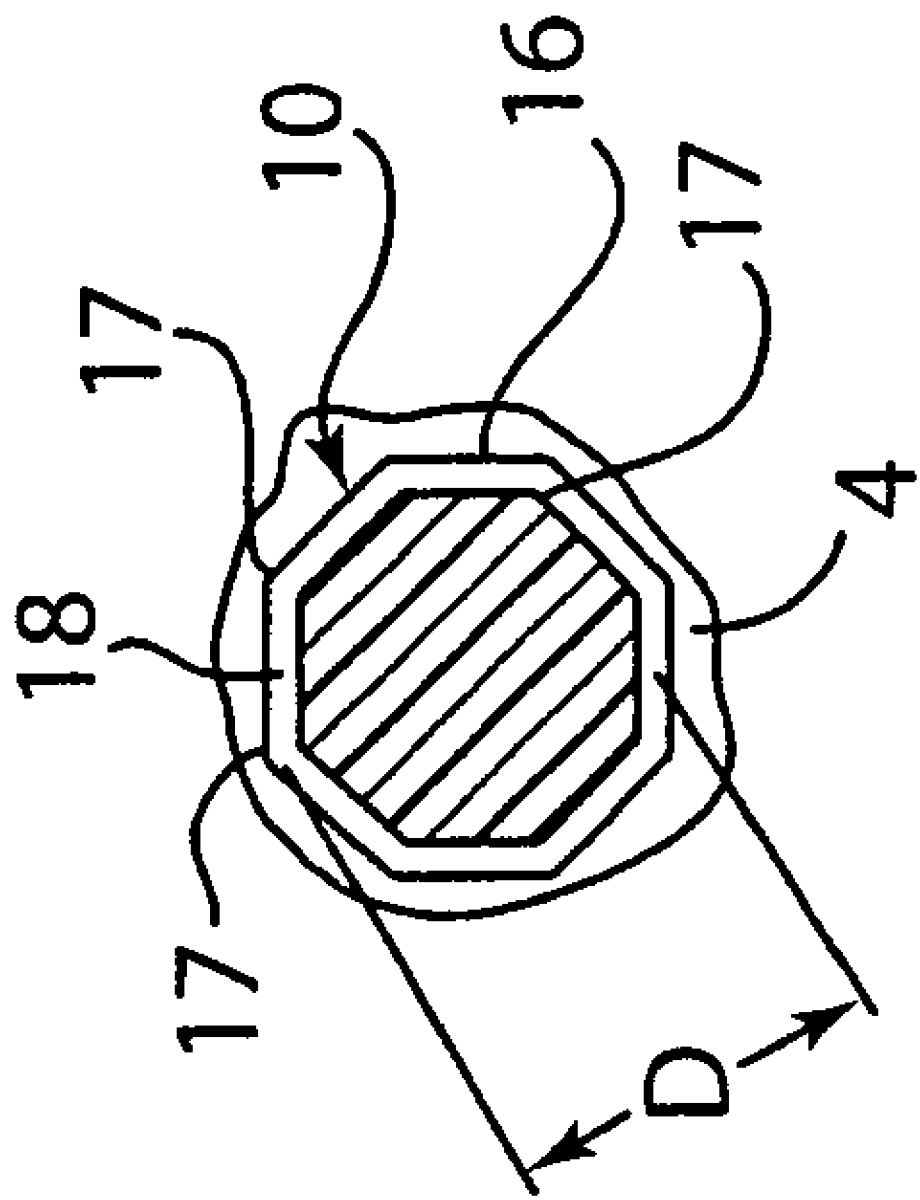

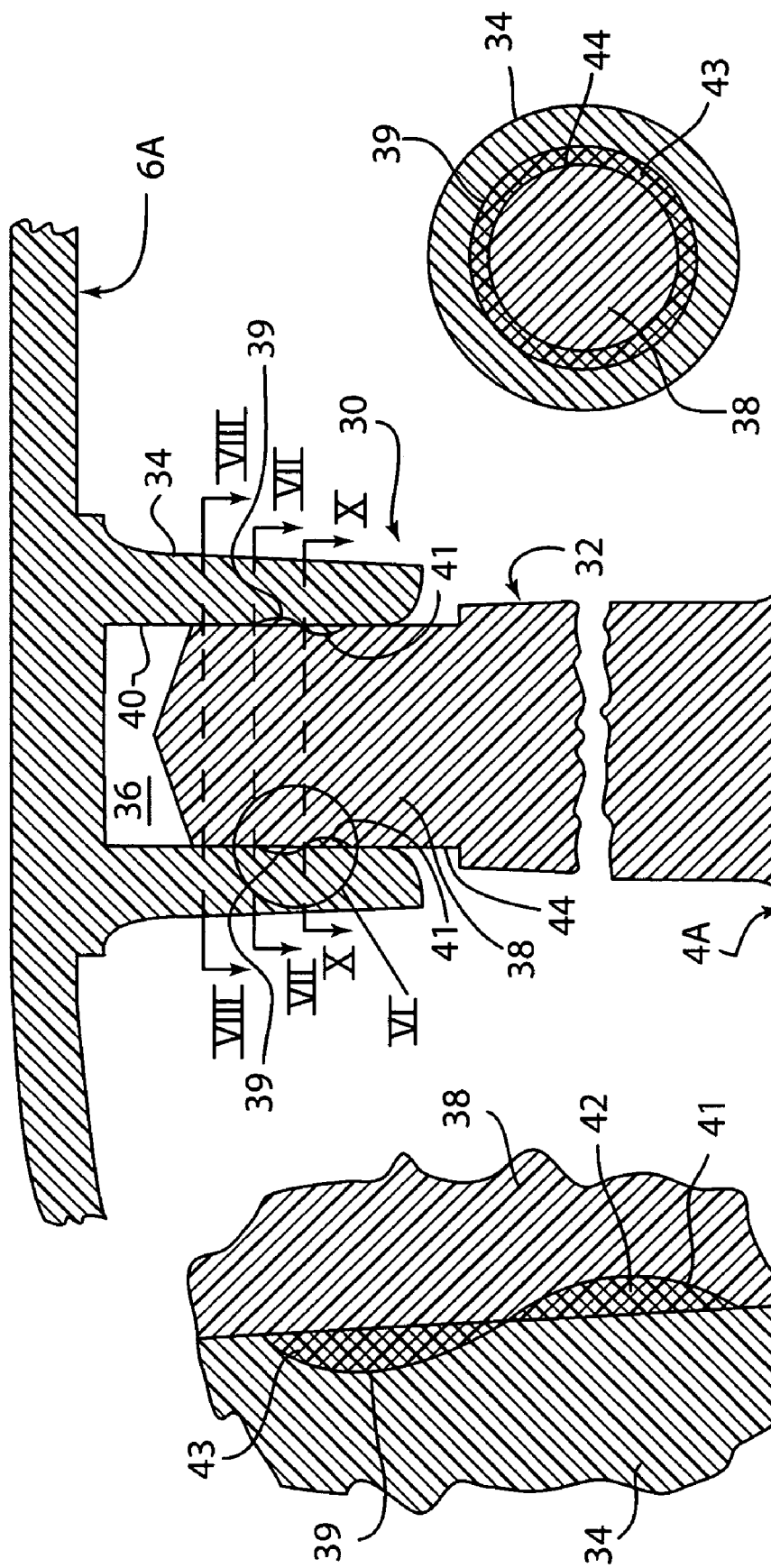

VEHICLE VISOR CONSTRUCTION AND METHOD

BACKGROUND OF THE INVENTION

The present invention pertains to an automotive visor snap, and particularly to one that acts as a friction snap in order to connect two halves of a butterfly-style automotive sun visor.

Visors for vehicles, and particularly those employing a butterfly-type core construction, have been made utilizing a variety of materials, which can be folded and upholstered to form a visor body. These butterfly-type cores form an automotive sun visor when the two halves of the butterfly core are connected. The core halves are typically pressed together and bonded by a heat sealing or melting operation. In some other instances, parallel wall structures are used on one of the core members to capture a wall structure on the other core member to hold the core halves together. In some visor structures, deflectable hook members are used on one of the core members with structure on the other core member to deflect the hook around and to engage with the retaining structure.

Thus, although there are various methods of connecting butterfly-type visor cores, the manufacture of such visors is somewhat expensive due to melting and gluing operations. Moreover, the visor core halves may separate after manufacturing of the visor, if the glue or melting operations do not successfully and completely connect the butterfly visor core halves. With the increasing sensitivity to the costs of vehicle components by manufacturers, it is desirable to have a means for connecting butterfly visor cores, which is relatively inexpensive, requires less materials, and completely connects the two halves of the butterfly visor core.

SUMMARY OF THE INVENTION

The automotive visor snap of the present invention provides a relatively inexpensive way to connect the cores of a butterfly-type visor. It accomplishes this goal by providing a plurality of friction snaps. The friction snap consists of a hole that frictionally receives a corresponding post. The hole may be round with no draft or it may have a reverse draft on the sides of the hole. The post may be 8-sided and may have no draft or it may have a positive draft on the sides so that the post is slightly larger than the diameter of the hole to create an interference fit when snapped into place. The post and/or side walls of the hole may melt due to the friction to thereby melt together post and hole.

Visors embodying the present invention may be assembled by a high-speed closure process that will allow the friction fit of the 8-sided post in the holes to create a high strength bond connecting the two halves of the visor core. When a plurality of the 8-sided posts of one-half of the visor core are frictionally received by the round holes of the other half of the visor core, the visor core is completed.

These and other features, advantages and objects of the present invention will be further understood and appreciated by those skilled in the art by reference to the following specification, claims and appended drawings.

BRIEF DESCRIPTION OF THE DRAWINGS

FIG. 4 is a cross-sectional view of the post of FIG. 3 taken along the line IV—IV;

FIG. 5 is a cross-sectional view of a friction snap according to another aspect of the present invention;

FIG. 6 is an enlarged view of a portion of the friction snap of FIG. 5;

FIG. 7 is a cross-sectional view of the friction snap of FIG. 5 taken along the line VII—VII;

FIG. 5.

DETAILED DESCRIPTION OF PREFERRED EMBODIMENT

Figure 1:
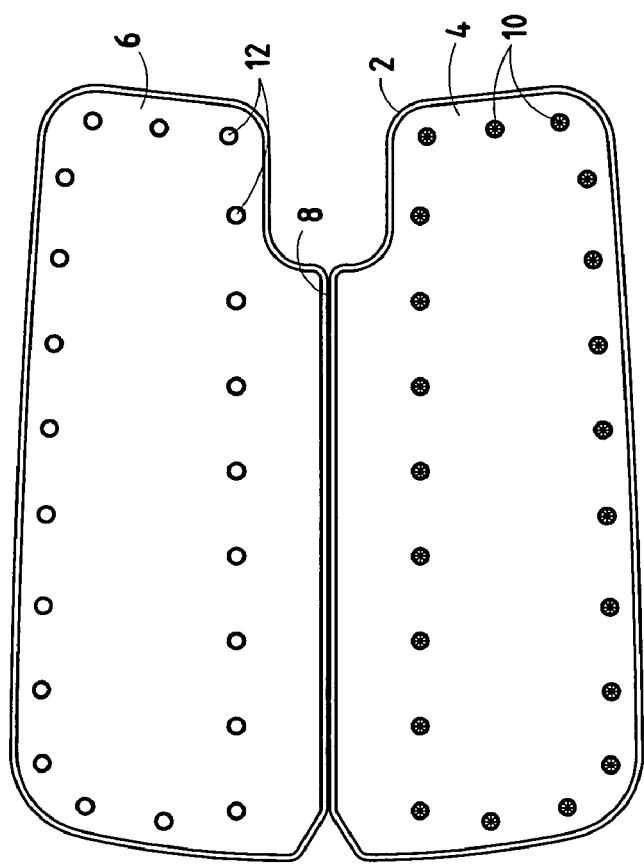
FIG. 1 is a top plan view of a butterfly valve visor core utilizing a plurality of friction snaps of the present invention.
Figure 2:
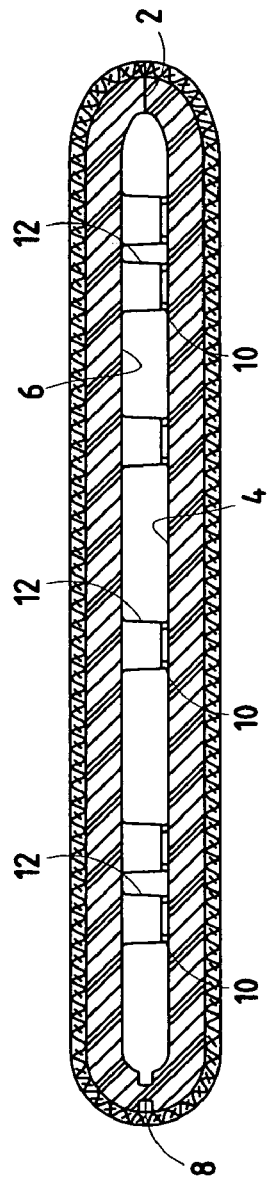
FIG. 2 is a cross-section of a simple visor core utilizing the friction snaps of the present invention.

Referring initially to FIGS. 1 and 2, an unassembled butterfly visor core 2 for vehicle sun visors according to one aspect of the present invention includes halves 4 and 6 which are folded about a midline 8 between the two halves 4 and 6. The midline 8 may be an integral living hinge or other suitable connecting arrangement. As illustrated in FIG. 2, visor core 2 may be covered in a conventional manner utilizing a layer of material 7 such as fabric, leather, vinyl or the like.

Friction snaps such as posts 10 are located on one of the visor core halves. In the illustrated embodiment, the posts 10 are located on the half 4 of the visor core 2, and snap receptors 12 are located on the other half 6.

Figure 3:
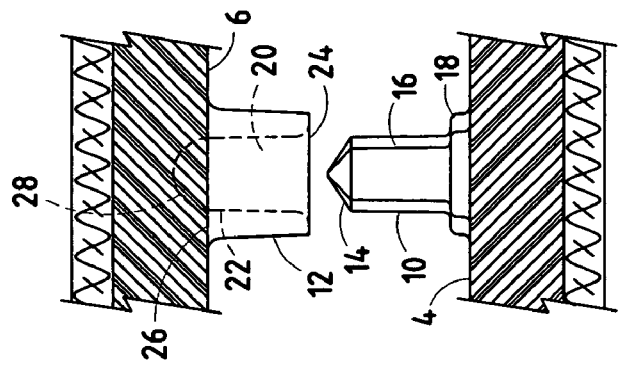
FIG. 3 is a side perspective view of the friction snap and corresponding hole of the present invention.

In the illustrated example, the posts 10 are 8-sided with either no draft or positive draft on each of the sides of posts 10. A positive draft can be obtained on one or more of the 8 sides 16 of the posts 10 by increasing the circumference of the posts 10 from the tops 14 to the bases 18. (FIG. 3).

The snap receptors 12 located on the visor core half opposite the posts 10 are spaced n a pattern corresponding to that of posts 10 such that each of the posts 10 engages a receptor 12 when the halves 4 and 6 are folded about midline 8. Snap receptors 12 include holes 20 which receive posts 10. The walls 22 of the holes 20 may contain no draft or positive or reverse draft on the walls 22 of the hole. If the holes 20 contain reverse draft, the circumference of the holes 20 decrease from the tops 24 to the bases 26. Furthermore, the holes 20 may have extensions 28 which extend through the bases 26 of the snap receptors 12 and into the visor core half 6.

The right visor core half 4 contains a plurality of posts 10 at or near the periphery of the edges of the right visor core half 4. Additionally, posts 10 may be located at or near the midline 8 of the visor core 2 and even intermittently at various places on the visor core half 4. Similarly, the visor core half 6 contains snap receptors 12 at or near the periphery of the left visor core half 6. The left visor core half 6 may also contain snap receptors at or near the midline 8 of the visor core 2 over at various places within the left visor core. The posts 10 and snap receptors 12 that are located on the visor core 2 should be molded into the visor core half such that the snap receptors 12 receive the posts 10 when the two visor core halves are snapped together and rotated about the midline 8. Thus, the friction snaps 10 should be displaced on the right visor core half 4 in the same places that the snap receptors 12 are located on the left visor core half 6. Also, the posts 10 may be located on both the right visor core half 4 and the left visor core half 6 so long as each post 10 has a corresponding snap receptor 12 for receiving the posts 10.

The visor cores are preferably molded of a polymer material, and may be assembled by a high-speed closure process wherein the visor core halves 4 and 6 are rotated about an integral midline 8 such that the plurality of friction snaps 10 frictionally fit with the snap receptors 12. With further reference to FIG. 4, the sides 16 of posts 10 may form a hexagonal cross-sectional shape with a plurality of edges 17. The overall dimension "D" between the corners 17 may be larger than the diameter of the holes 20, such that an interference fit is created between the edges 17 and walls 22 of holes 20. As the post 10 is inserted into the opening 20, the interference between the corner 17 and side walls 22 creates a relatively high amount of friction. The friction, in turn, creates substantial heat, such that the edges 17 and portions of the sides 16 may melt, and portions of the side walls 22 may also melt, such that the posts 10 and snap receptor 12 become welded together by the melting action. As discussed above, the posts 10 and/or side walls 22 may be tapered in either a positive or negative sense. The shape and size of the posts 10 and opening 20 can be varied as required to provide the desired degree of melting during the fabrication process. Also, posts 10 could have a circular cross-sectional shape, or other cross-sectional shapes providing the proper friction, interference and melting characteristics for a given application. The snap receptor 12 may have a circular or non-circular shape. For example, a round post 10 and hexagonal receptor 12 could be utilized to provide an interference fit creating friction to melt the post 10 in receptor 12. Alternately, the post 10 and receptor 12 could both be round, with at least a portion of the post 10 having a transverse dimension greater than that of receptor 12 to provide an interference fit.

With further reference to FIG. 5, a snap 30 according to another aspect of the present invention includes a post 32 and an extension 34 having a cavity 36 that receives the end 38 of post 32. Cavity 36 includes a cylindrical side wall 40, and an annular ring 41 that creates an area of interference 42 (FIG. 6) with the end portion 38 of post 32. The areas of interference of snap 30 are shown in cross hatch in FIG. 6–10. End portion 38 of post 32 includes a raised annular ring portion 39 that creates an area of interference 43 with the extension 34.

Figure 9:
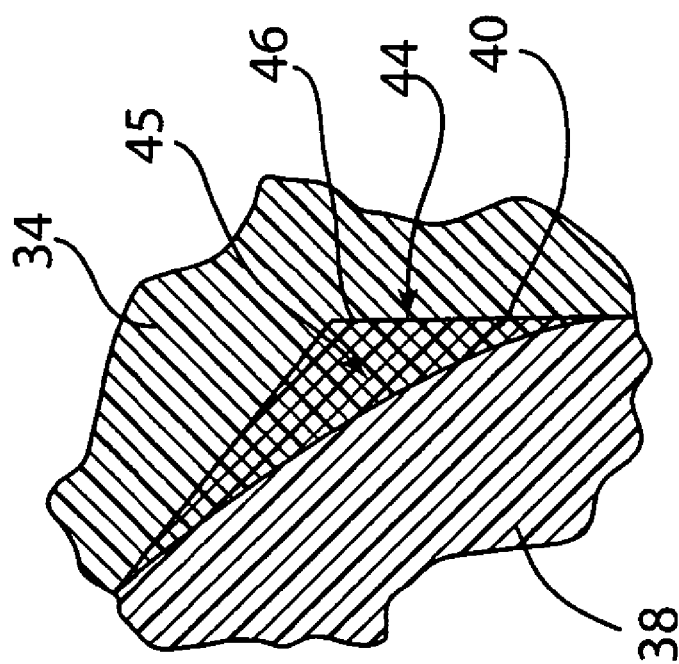
FIG. 9 is an enlarged view of a portion of the friction snap of FIG. 8.
Figure 8:
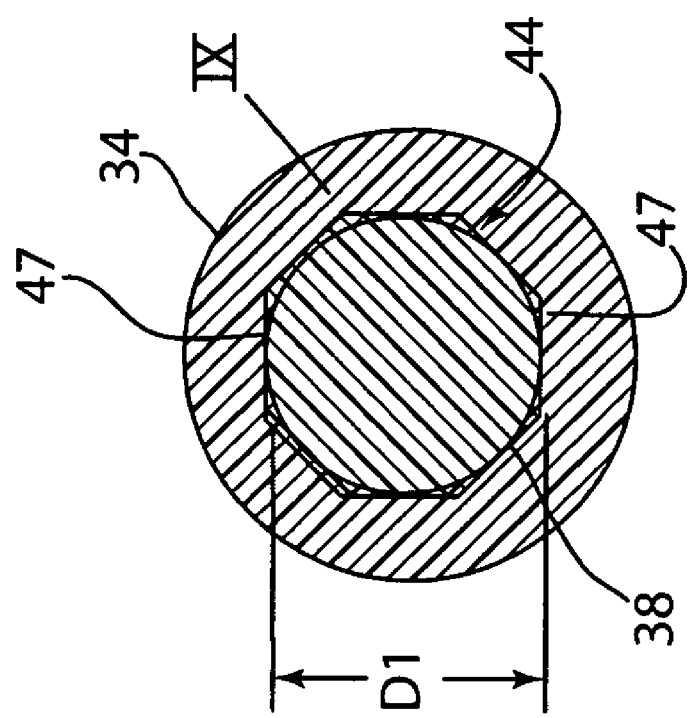
FIG. 8 is a cross-sectional view of the friction snap of FIG. 5 taken along the line VIII—VIII.

With reference to FIG. 7, at the raised ring 39, the area of interference 43 has a uniform cross-sectional thickness formed by the difference in diameters between the raised annular ring 39 and the outer surface 44 of the upper portion 38 of post 32. With further reference to FIGS. 8 and 9, the outer surface 44 of post 32 has a hexagonal shape (except at raised annular ring 39), such that areas of interference 45 are formed at the corner portions 46 of post 32 where the corner portions interfere with the circular wall 40 of extension 34. These areas of interference are in addition to the areas of interference 42 and 43 discussed above. The upper portion 38 of post 32 has a hexagonal shape with faces 47 having a dimension "D1" (FIG. 8) across the flats. The dimension D1 is equal to the diameter of the cylindrical side wall 40 of cavity 36 of extension 34, such that the area of interference 45 has a shape that is equal to the difference in shape between the circular side wall 40 and the hexagonal shape of upper portion 38 of post 32 (except at annular rings 39 and 41).

Figure 10:
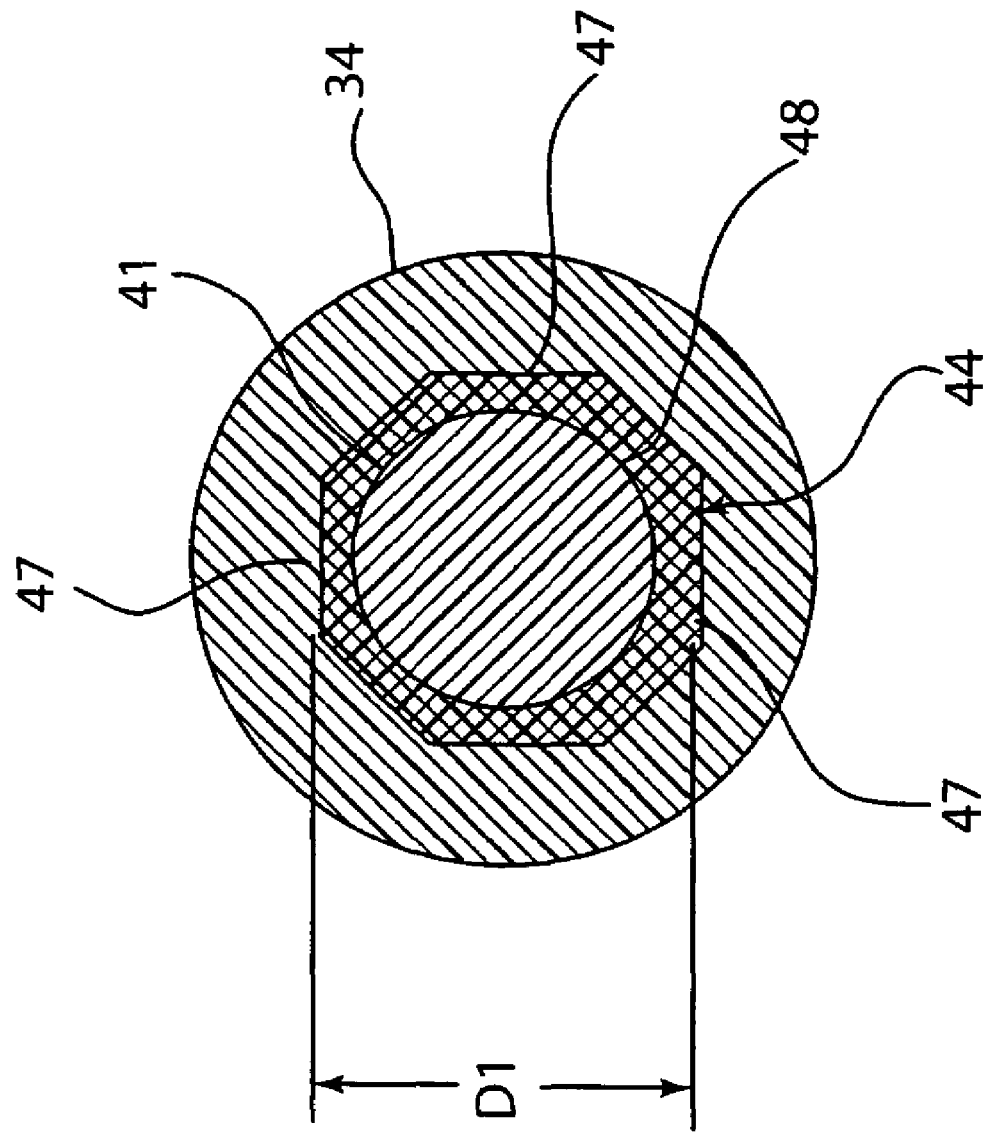
FIG. 10 is a cross-sectional view taken along the line X—X.

With further reference to FIG. 10, ring 41 of side wall 40 of cavity 36 extends inwardly beyond the dimension D1 across the flat side surfaces of upper portion 38 of post 32, thereby forming an area of interference 48.

During assembly of the embodiment illustrated in FIGS. 5–10, end 38 of post 32 is inserted into cavity 36 of extension 34. As the end portion 38 is inserted, the interference between the end portion 38 inside wall 40 of cavity 36 due to the interference created by rings 39 and 41, as well as the interference caused by the corner portions 46 of upper portion 38 of post 32 may cause the upper portion 38 of post 32 to melt together in the areas of interference, thereby securely interconnecting the visor halves 4A and 6A.

It will be appreciated that the dimensions of the post and the dimensions of the cavity that receives the post may be chosen to provide the proper amount of interference for a particular application. For example, the amount of interference could be relatively low, such that no melting occurs during assembly, with the friction between the post and cavity retaining the visor core halves together.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A visor core for motor vehicles, comprising:
    a body made of a polymer material and including first and second halves interconnected by a hinge, the first and second halves together defining an internal cavity when folded together about a hinge to define a fully folded configuration in which the visor core is suitable for use in a vehicle interior;
    a connector including a post and a connector cavity that receives at least a portion of the post when the first and second halves are folded together to the fully folded configuration, the post defining a full insertion depth in the connector cavity when the first and second halves are in the fully folded configuration, wherein the connector cavity defines a side wall and the post has a non-circular cross-sectional shape and tightly engages the side wall of the connector cavity when the post is at the full insertion depth and securely interconnecting the first and second halves, and wherein the post frictionally engages the side wall of the connector cavity, and at least some of the post material is melted to the side wall of the connector cavity.

2. The visor core of claim 1, wherein:
    the post defines a transverse dimension greater than a dimension of the connector cavity and forms an interference fit when received in the connector cavity.

3. The visor core of claim 2, wherein:
    the post has a polygonal cross-sectional shape.

4. The visor core of claim 3, wherein:
    the post has a hexagonal cross-sectional shape.

5. The visor core of claim 1, wherein:
    the first and second halves have a shallow, generally concave shape with peripheral edges that abut one another to form a smooth peripheral side wall when the first and second halves are folded together, and wherein:
    the connector comprises a plurality of post and connector cavity pairs spaced adjacent the peripheral edges.

6. The visor core of claim 1, wherein:
    the post includes a stepped base surface; and the connector cavity comprises end surfaces that contact the base surface when the post is fully received in the connector cavity.

7. A visor core for motor vehicles, comprising:

a body made of a polymer material and including first and second halves interconnected by a hinge, the first and second halves together defining an internal cavity when folded together about a hinge to define a fully folded configuration in which the visor core is suitable for use in a vehicle interior;

a connector including a post and a connector cavity that receives at least a portion of the post when the first and second halves are folded together to the fully folded configuration, the post defining a full insertion depth in the connector cavity when the first and second halves are in the fully folded configuration, wherein the connector cavity defines a side wall and the post tightly engages the side wall of the connector cavity when the post is at the full insertion depth and forming an interference fit and securely interconnecting the first and second halves, and wherein some of the post material and the cavity side wall material are melted together.

8. The visor core of claim 7, wherein:

the post has a non-circular cross-sectional shape.

9. The visor core of claim 8, wherein:

the post has tapered side surfaces.

10. The visor core of claim 7, wherein:

the post has a pointed tip to facilitate insertion of the post into the connector cavity.

11. The visor core of claim 7, wherein:

the side wall of the connector cavity is cylindrical.

12. The visor core of claim 11, wherein:

the first and second halves have a shallow, generally concave shape with peripheral edges that abut one another to form a smooth peripheral side wall when the first and second halves are folded together, and wherein:

the connector comprises a plurality of post and connector cavity pairs spaced adjacent the peripheral edges.

13. The visor core of claim 12, wherein:

the post includes a stepped base surface; and the connector cavity comprises end surfaces that contact the base surface when the post is fully received in the connector cavity.

14. A visor core for motor vehicles, comprising:

a body including first and second body portions interconnected by a hinge;

a connector including a protrusion on the first body portion and a connector cavity on the second body portion that receives at least a portion of the protrusion, wherein the connector cavity defines a side wall surface and the protrusion defines an outer surface configured to tightly engage the side wall of the connector cavity in an interference fit to securely interconnect the first and second body portions, and wherein the body is made of a polymer material, and at least a portion of the protrusion and the side wall surface melt together.

15. The visor core of claim 14, wherein:

the protrusion comprises a post; and at least one of the cavity side wall surface and the outer surface of the post include an annular raised portion forming an interference fit between the post and the cavity.

16. The visor core of claim 15, wherein:

the post has a non-circular cross-sectional shape.

* * * * *